United States Patent
Rozo (10) Patent No.: US 10,913,152 B2
(45) Date of Patent: Feb. 9, 2021

(54) ROBOT DEVICE CONTROLLER, ROBOT DEVICE ARRANGEMENT AND METHOD FOR CONTROLLING A ROBOT DEVICE

(71) Applicant: Robert Bosch GmbH, Stuttgart (DE)

(72) Inventor: Leonel Rozo, Boeblingen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/891,917

(22) Filed: Jun. 3, 2020

(65) Prior Publication Data

US 2020/0384639 A1 Dec. 10, 2020

(30) Foreign Application Priority Data

Jun. 7, 2019 (EP) .................................. 19179086

(51) Int. Cl.
*B25J 9/16* (2006.01)
*G06N 7/00* (2006.01)
*B25J 13/08* (2006.01)

(52) U.S. Cl.
CPC ............. *B25J 9/163* (2013.01); *B25J 9/1664* (2013.01); *B25J 13/085* (2013.01); *G06N 7/005* (2013.01)

(58) Field of Classification Search
CPC ........ B25J 9/163; B25J 9/1664; B25J 13/085; G06N 7/005
See application file for complete search history.

(56) References Cited

U.S. PATENT DOCUMENTS

| | | | | |
|---|---|---|---|---|
| 9,592,608 B1 * | 3/2017 | Bingham | ............. | G05B 19/423 |
| 10,016,900 B1 * | 7/2018 | Meyer | .................... | A61B 34/30 |
| 10,324,425 B2 * | 6/2019 | Takahashi | .............. | G05B 13/04 |
| 2005/0222714 A1 * | 10/2005 | Nihei | ................... | G05B 19/423 |
| | | | | 700/264 |
| 2010/0114371 A1 * | 5/2010 | Tsusaka | ................. | B25J 9/0084 |
| | | | | 700/250 |

(Continued)

FOREIGN PATENT DOCUMENTS

JP 2019055458 A * 4/2019

OTHER PUBLICATIONS

Dylan P. Losey et al., "Trajectory Deformations from Physical Human-Robot Interaction", arxiv.org, Cornell University Library, 201 Olin Library Cornell University Ithaca, NY 14853, Oct. 26, 2017, 13 pages.

(Continued)

*Primary Examiner* — Khoi H Tran
*Assistant Examiner* — Jorge O Peche
(74) *Attorney, Agent, or Firm* — Norton Rose Fulbright US LLP; Gerard Messina (57) ABSTRACT

A robot device controller including a memory configured to store a statistical model trained to implement a behaviour of the robot device, one or more processors configured to determine a nominal trajectory represented by the statistical model, determine an expected force experienced by the robot device when the robot device is controlled to move in accordance with the nominal trajectory, determine a measured force experienced by the robot device when the robot device is controlled to move in accordance with the nominal trajectory and adapt the statistical model based on a reduction of the difference between the measured force and the expected force.

23 Claims, 4 Drawing Sheets

(56) References Cited

U.S. PATENT DOCUMENTS

| | | | | |
|---|---|---|---|---|
| 2010/0256812 A1* | 10/2010 | Tsusaka | ................. | A47L 9/2852 |
| | | | | 700/254 |
| 2010/0286826 A1* | 11/2010 | Tsusaka | ................. | B25J 9/1633 |
| | | | | 700/254 |
| 2011/0015785 A1* | 1/2011 | Tsusaka | ................. | B25J 9/0003 |
| | | | | 700/254 |
| 2011/0015787 A1* | 1/2011 | Tsusaka | ............... | G05B 19/423 |
| | | | | 700/264 |
| 2011/0190932 A1* | 8/2011 | Tsusaka | ................... | B25J 13/08 |
| | | | | 700/254 |
| 2012/0101508 A1* | 4/2012 | Wook Choi | ........... | A61B 34/30 |
| | | | | 606/130 |
| 2013/0289767 A1* | 10/2013 | Lim | ........................ | A61B 34/76 |
| | | | | 700/253 |
| 2015/0019016 A1* | 1/2015 | Aguerre | ................. | B25J 9/1674 |
| | | | | 700/260 |
| 2015/0127150 A1* | 5/2015 | Ponulak | ............... | G05D 1/0088 |
| | | | | 700/250 |
| 2016/0073945 A1* | 3/2016 | Fine | ........................ | G16H 50/20 |
| | | | | 600/558 |
| 2017/0113349 A1* | 4/2017 | Naitou | ................... | B25J 9/1674 |
| 2017/0173790 A1* | 6/2017 | Tan | ........................... | B60T 7/16 |
| 2017/0348854 A1* | 12/2017 | Oleynik | ................. | A47J 47/02 |
| 2018/0089589 A1* | 3/2018 | Ooba | ................. | G05B 19/4182 |
| 2018/0107174 A1* | 4/2018 | Takahashi | ................. | G05B 9/02 |
| 2018/0283017 A1* | 10/2018 | Telleria | ................ | B25J 11/0075 |
| 2018/0368752 A1* | 12/2018 | Fine | ..................... | A61B 5/1124 |
| 2018/0370030 A1* | 12/2018 | Sedlmayr | ................ | B25J 9/1656 |
| 2019/0143530 A1* | 5/2019 | Masuda | ................. | B25J 9/1689 |
| | | | | 700/245 |
| 2020/0147787 A1* | 5/2020 | Takahashi | .............. | B25J 9/1633 |
| 2020/0206943 A1* | 7/2020 | Koo | ....................... | B25J 13/087 |

OTHER PUBLICATIONS

Shun-Zheng Yu, "Hidden semi-Markov models", Artificial Intelligence, vol. 174 vo. 2, 2010, Retrieved from the Internet on May 29, 2020: https://www.sciencedirect.com/science/article/pii/S0004370209001416?via%3Dihub, 29 pages.

Leonel Rozo et al., "Learning Force and Position Constraints in Human-robot Cooperative Transportation", The 23rd IEEE International Symposium on Robot and Human Interactive Communication, IEEE, Aug. 25, 2014, 2014, 6 pages.

Aleksandar Vakanski et al., "Trajectory Learning for Robot Programming by Demonstration Using Hidden Markov Model and Dynamic Time Wraping", IEEE Transactions on Systems, Man, and Cybernetics. Part B: Cybernetics, vol. 42, No. 4, Aug. 1, 2012, 14 pages.

Leonel Rozo et al., "Robot Learning from Demonstration of Force-based Tasks with Multiple Solution Trajectories", Advanced Robotics (ICAR), 2011 15th International Conference On, IEEE, Jun. 20, 2011, 6 pages.

Liu Hung-Shen et al., "Robot Trajectory Modification Using Human-Robot Force Interaction", 2017 56th Annual Conference of the Society of Instrument and Control Engineers of Japan (SICE), The Society of Instrument and Control Engineers—SICE, Sep. 19, 2017, 4 pages.

Written Opinion and European Search Report for EP19179086.4, dated Dec. 16, 2019.

\* cited by examiner

ROBOT DEVICE CONTROLLER, ROBOT
DEVICE ARRANGEMENT AND METHOD
FOR CONTROLLING A ROBOT DEVICE

CROSS REFERENCE

The present application claims the benefit under 35 U.S.C. § 119 of European Patent Application EP 19179086.4 filed on Jun. 7, 2019, which is expressly incorporated herein by reference in its entirety.

FIELD

The present disclosure relates to robot devices, robot device arrangements and methods for controlling a robot device.

BACKGROUND INFORMATION

Flexible manufacturing processes demand robots to easily adapt to changes in the environment and interact with humans. In such dynamic scenarios, robotic tasks may be programmed through learning-from-demonstration approaches, where a nominal plan of the task is learned by the robot. However, the learned plan may need to be refined or adapted in order to fulfil additional requirements or overcome unexpected environment changes. When the required adaptation occurs at the end-effector trajectory level, a human operator may want to intuitively show the robot the desired changes by physically interacting with it. In such a scenario, the robot requires to understand the human intended changes from noisy haptic data, quickly adapt accordingly and be able to execute the nominal task plan when no further adaptation is needed.

In "Trajectory deformations from physical human-robot interaction" by S. Losey and M. Malley, in IEEE T-RO, vol. 34, no. 1, pp. 126-138, 2018, an analytical smooth family of trajectories is used to find local spatial trajectory deformations as a function of the applied force.

In view of the above, efficient approaches allowing physically interactive trajectory adaptations are desirable.

SUMMARY

According to various embodiments of the present mention, a robot device controller is provided including a memory configured to store a statistical model trained to implement a behaviour of the robot device, one or more processors configured to determine a nominal trajectory represented by the statistical model, determine an expected force experienced by the robot device when the robot device is controlled to move in accordance with the nominal trajectory, determine a measured force experienced by the robot device when the robot device is controlled to move in accordance with the nominal trajectory and adapt the statistical model based on a reduction of the difference between the measured force and the expected force.

According to further embodiments of the present invention, a robot device arrangement including a robot device and a robot device controller as above and a method for controlling a robot device according to the above robot device controller are provided.

The robot device controller, robot device arrangement and method for controlling a robot device provided according to various embodiments of the present invention allow an efficient adaptation of the trajectory of a robot device by means of adaptation of a statistical model—in particular an online adaptation—as a function of the sensed interaction forces.

Various Examples are described in the following:

Example 1 in accordance with the present invention is a robot device controller including a memory configured to store a statistical model trained to implement a behaviour of the robot device and one or more processors configured to determine a nominal trajectory represented by the statistical model, determine an expected force experienced by the robot device when the robot device is controlled to move in accordance with the nominal trajectory, determine a measured force experienced by the robot device when the robot device is controlled to move in accordance with the nominal trajectory and adapt the statistical model based on a reduction of the difference between the measured force and the expected force.

Thus, the desired trajectory of a robot, e.g., a robot end-effector, may be shaped by physical interaction based on a difference between an expected and measured force and adaptation of a statistical model, which serves as a basis for the robot control. This allows an efficient adaptation of a robot trajectory.

Example 2 in accordance with the present invention is the robot device controller according to Example 1, wherein the one or more processors are configured to adapt the statistical model by adapting one or more parameters of the statistical model including at least one parameter of one or more probability distributions.

Example 3 in accordance with the present invention is the robot device controller according to Example 1 or 2, wherein the one or more processors are configured to adapt the statistical model by adapting one or more parameters of the statistical model including at least one of a mean and a standard deviation of one or more Gaussian distributions.

Example 4 in accordance with the present invention is the robot device controller according to Example 2 or 3, wherein the one or more processors are configured to adapt the one or more parameters based on an optimization.

Example 5 in accordance with the present invention is the robot device controller according to Example 4, wherein the optimization is based on an objective function based on a difference between the actual force and the experienced force.

Example 6 in accordance with the present invention is the robot device controller according to Example 4 or 5, wherein the optimization is based on a Bayesian optimization or a Covariance Matrix Adaptation Evolution Strategy.

Example 7 in accordance with the present invention is the robot device controller according to any one of Examples 1 to 6, wherein the statistical model has a plurality of hidden states, each state being associated with an observation probability distribution.

Example 8 in accordance with the present invention is the robot device controller according to Example 7, wherein the one or more processors are configured to detect a trajectory adaptation event based on a difference between the measured force and the expected force, to determine a state of the statistical model representing the part of the nominal trajectory in which the trajectory adaptation event has occurred and to perform the optimization over parameters of the observation probability distribution.

Example 9 in accordance with the present invention is the robot device controller according to Example 8, wherein the one or more processors are configured to further perform the optimization over parameters of a duration probability distribution associated with the determined state.

Example 10 in accordance with the present invention is the robot device controller according to Example 8 or 9, wherein the one or more processors are configured to omit from the optimization parameters of probability distributions associated with other states than the determined state.

Example 11 in accordance with the present invention is the robot device controller according to Example 8 or 9, wherein the one or more processors are configured to limit the optimization to parameters of probability distributions associated with the determined state.

Example 12 in accordance with the present invention is the robot device controller according to any one of Examples 1 to 11, wherein the one or more processors are configured to train the statistical model based on one or more demonstrations of at least one trajectory.

Example 13 in accordance with the present invention is the robot device controller according to any one of Examples 1 to 12, wherein the statistical model is a Gaussian mixture model, a hidden Markov model or a hidden semi-Markov model.

Example 14 in accordance with the present invention is the robot device controller according to any one of Examples 1 to 13, wherein the one or more processors are configured to control the robot device according to the nominal trajectory up to an trajectory adaptation event detected based on a difference between the measured force and the expected force, to adapt the statistical model and continue to control the robot according to an adapted trajectory represented by the adapted statistical model after the trajectory adaptation event.

Example 15 in accordance with the present invention is a robot device arrangement including a robot device and a robot device controller according to any one of Examples 1 to 14.

Example 16 in accordance with the present invention is the robot device arrangement according to Example 15, wherein the robot device includes one or more sensors configured to measure the measured force experienced by the robot device when the robot device is controlled to move in accordance with the nominal trajectory.

Example 17 in accordance with the present invention is a method for controlling a robot device including storing a statistical model trained to implement a behaviour of a robot device, determining a nominal trajectory represented by the statistical model, determining an expected force experienced by the robot device when the robot device is controlled to move in accordance with the nominal trajectory, determining a measured force experienced by the robot device when the robot device is controlled to move in accordance with the nominal trajectory and adapting the statistical model based on a reduction of the difference between the measured force and the expected force.

Example 18 in accordance with the present invention is the method according to Example 17, including adapting the statistical model by adapting one or more parameters of the statistical model including at least one parameter of one or more probability distributions.

Example 19 in accordance with the present invention is the method according to Example 17 or 18, including adapting the statistical model by adapting one or more parameters of the statistical model including at least one of a mean and a standard deviation of one or more Gaussian distributions.

Example 20 in accordance with the present invention is the method according to Example 18 or 19, including adapting the one or more parameters based on an optimization.

Example 21 in accordance with the present invention is the method according to Example 20, wherein the optimization is based on an objective function based on a difference between the actual force and the experienced force.

Example 22 in accordance with the present invention is the method according to Example 20 or 21, wherein the optimization is based on a Bayesian optimization or a Covariance Matrix Adaptation Evolution Strategy.

Example 23 in accordance with the present invention is the method according to any one of Examples 17 to 22, wherein the statistical model has a plurality of hidden states, each state being associated with an observation probability distribution.

Example 24 in accordance with the present invention is the method according to Example 23, including detecting a trajectory adaptation event based on a difference between the measured force and the expected force, determining a state of the statistical model representing the part of the nominal trajectory in which the trajectory adaptation event has occurred and performing the optimization over parameters of the observation probability distribution.

Example 25 in accordance with the present invention is the method according to Example 24, further including performing the optimization over parameters of a duration probability distribution associated with the determined state.

Example 26 in accordance with the present invention is the method according to Example 24 or 25, including omitting parameters of probability distributions associated with other states than the determined state from the optimization.

Example 27 in accordance with the present invention is the method according to Example 24 or 25, including limiting the optimization to parameters of probability distributions associated with the determined state.

Example 28 in accordance with the present invention is the method according to any one of Examples 17 to 27, including training the statistical model based on one or more demonstrations of at least one trajectory.

Example 29 in accordance with the present invention is the method according to any one of Examples 17 to 28, wherein the statistical model is a Gaussian mixture model, a hidden Markov model or a hidden semi-Markov model.

Example 30 in accordance with the present invention is the method according to any one of Examples 17 to 29, including controlling the robot device according to the nominal trajectory up to an trajectory adaptation event detected based on a difference between the measured force and the expected force, adapting the statistical model and continuing to control the robot according to an adapted trajectory represented by the adapted statistical model after the trajectory adaptation event.

Example 31 in accordance with the present invention is the method according to any one of Examples 17 to 30, including measuring the measured force experienced by the robot device by means of one or more sensors when the robot device is controlled to move in accordance with the nominal trajectory.

According to a further Example in accordance with the present invention, a computer readable medium is provided storing instructions which, when executed by a processor, makes the processor perform a method according to any one of Examples 17 to 31.

In the figures, like reference characters generally refer to the same parts throughout the different views. The figures are not necessarily to scale, emphasis instead generally being placed upon illustrating the principles of the present invention. In the description below, various aspects are described with reference to the figures.

DETAILED DESCRIPTION OF EXAMPLE EMBODIMENTS

The detailed description below refers to the figures that show, by way of illustration, specific details and aspects of this disclosure in which the present invention may be practiced. Other aspects may be utilized and structural, logical, and electrical changes may be made without departing from the scope of the present invention. The various aspects of this disclosure are not necessarily mutually exclusive, as some aspects of this disclosure can be combined with one or more other aspects of this disclosure to form new aspects.

In the following, various examples will be described in more detail.

Figure 1:
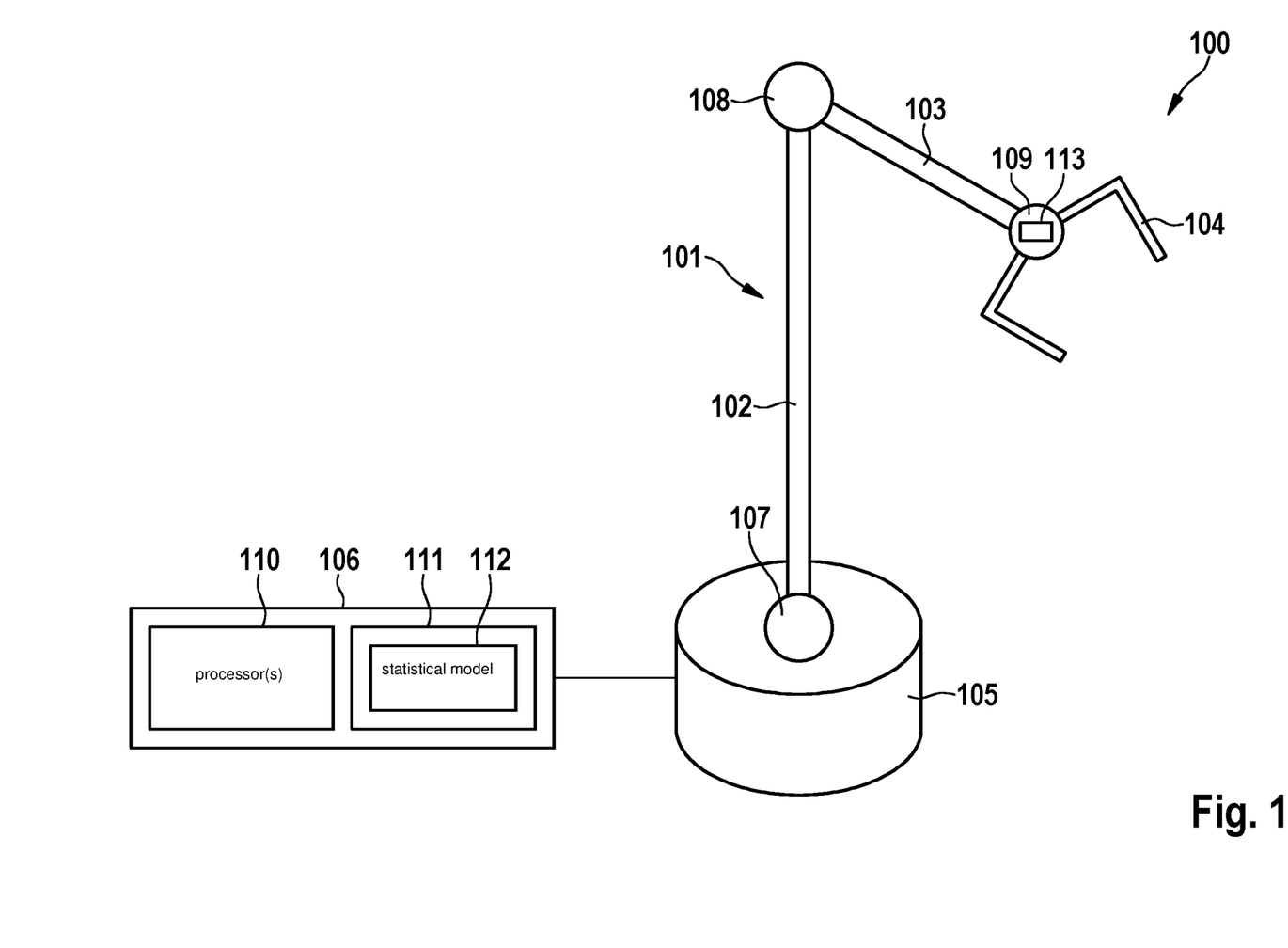
FIG. 1 shows a robot device arrangement.

FIG. 1 shows a robot device arrangement 100.

The robot device arrangement 100 includes a robot device 101, for example an industrial robot for handling, assembling or machining a workpiece. The robot device 101 includes manipulators 102, 103, 104 and a base (or support) 105 by which the manipulators 102, 103, 104 are supported. The term "manipulator" refers to the movable members of the robot device 101, the actuation of which enables physical interaction with the environment, e.g., to carry out a task. For control, the robot device arrangement 100 includes a controller 106 configured to implement the interaction with the environment according to a control program. The last member 104 (when viewed from the support 105) of the manipulators 102, 103, 104 is also referred to as the end-effector 104 and may include one or more tools such as a welding torch, gripping instrument, painting equipment, or the like.

The other manipulators 102, 103 (closer to the support 105) may form a positioning device such that, together with the end-effector 104, a robotic arm (more commonly referred to as an articulated arm) with the end-effector 104 at its end is provided. The robotic arm is mechanical arm that can provide similar functions as a human arm (possibly with a tool at its end).

The robot device 101 may be include joint elements 107, 108, 109 interconnecting the manipulators 102, 103, 104 with each other and with the support 105. A joint element 107, 108, 109 may have one or more joints, each of which may provide rotatable motion (i.e., rotational motion) and/or translatory motion (i.e., displacement) to associated manipulators relative to each other. The movement of the manipulators 102, 103, 104 may be initiated by means of actuators controlled by the controller 106.

The term "actuator" may be understood as a component adapted to affect a mechanism or process in response to be driven. The actuator can implement instructions issued by the controller 106 (the so-called activation) into mechanical movements. The actuator, e.g., an electromechanical converter, may be configured to convert electrical energy into mechanical energy in response to driving.

The term "controller" may be understood as any type of logic implementing entity, which may include, for example, a circuit and/or a processor capable of executing software stored in a storage medium, firmware, or a combination thereof, and which can issue instructions, e.g., to an actuator in the present example. The controller may be configured, for example, by program code (e.g., software) to control the operation of a system, a robot in the present example.

In the present example, the controller 106 includes one or more processors 110 and a memory 111 storing code and data based on which the processor 110 controls the robot device 101. According to various embodiments, the controller 106 controls the robot device 101 on the basis of a statistical model 112 stored in the memory 111.

A robot such as implemented by robot device arrangement 100 can take advantage of learning-from-demonstration approaches to learn to execute a task or collaborate with a human partner. Human demonstrations can be encoded by a probabilistic model (also referred to as statistical model) that represents the nominal plan of the task for the robot. The controller 106 can subsequently use the statistical model to generate the desired robot movements, possibly as a function of the state of both the human partner and the environment.

According to various embodiments of the present invention, a hidden semi-Markov model (HSMM) is generated and used as statistical model 112 to represent a nominal task plan of the robot. An HSMM allows encapsulating not only observed sensorimotor patterns but also the temporal structure of the task (e.g., of demonstrations). The controller 106 may combine the model 112 with a trajectory generation process that exploits task dynamic features to retrieve a smooth reference distribution of sensorimotor trajectories built on the nominal task plan. The controller may use this to both execute the desired task and monitor deviations that indicate an adaptation process. In the following, the learning model and retrieval of sensorimotor trajectories are described.

It should be noted that generally speaking, any statistical method that encodes the nominal plan as a set of Gaussian distributions may also be used to adapt the reference distribution. In this sense, models such as Gaussian mixture models (GMM) or hidden Markov models (HMM) may also be used. However, the limitation that these models show is the lack of a duration model (the duration probabilities in HSMM). Because of this, approaches based on those models are not able to adapt the duration of the nominal plan (while this is the case in the following examples), but will still be able to adapt the sensorimotor patterns.

A K-states hidden Markov model (HMM) is characterized by an initial state distribution $\{\pi_i\}_{i=1}^{K}$, a transition probability matrix $\{\alpha_{ij}\}_{i,j=1}^{K}$, and an observation distribution for each state i in the model, commonly represented by a Gaussian distribution $N(\mu_i, \Sigma_i)$, with mean $\mu_i$ and covariance matrix $\Sigma_i$. In HMM, the self-transition probabilities $a_{i,i}$ only allow a crude implicit modelling of the state duration, which follows a geometric distribution $P_i(d) = a_{i,i}^{d-1}(1-a_{i,i})$, decreasing exponentially with time. Thus, HMM is not suitable to encode tasks where temporal patterns are relevant.

Variable duration modelling techniques such as the hidden semi-Markov model (HSMM) extend standard HMMs by embedding temporal information of the underlying stochastic process. That is, while in HMM the underlying hidden process is assumed to be Markov, i.e., the probability of transitioning to the next state depends only on the current state, in HSMM the state process is assumed semi-Markov. This means that a transition to the next state depends on the current state as well as on the elapsed time since the state was entered. Since the state duration is always positive, its distribution should preferably be modelled by a function preserving this property. Thus, according to various embodiments, a univariate log normal distribution $N(\mu_i^D, \sigma_i^D)$ with mean $\mu_i^D$ and associated variance $\sigma_i^D$ are used to model the logarithm of the duration, which is equivalent to the use of a lognormal distribution to fit the duration data. Therefore, an HSMM is for example used characterized by the parameters $\Theta = \{\{a_{ij}\}_{j=1}^K, v_i^D, \sigma_i^D, \pi_i, \mu_i, \Theta_i\}_{i=1}^K$ which can be trained by an expectation-maximization procedure, e.g., based on demonstrations by a human user.

An example for a training process is as follows:
1. A human operator demonstrates the desired movements to the robot several times. To do so, the human operator can use different teaching modalities such as kinaesthetic teaching (i.e., physically moving the robot links) or teleoperation (i.e., using a 3D mouse or a haptic device), to generate a training dataset composed of training vectors $\xi \in \mathbb{R}^{2D}$ which represent the Cartesian position of the robot end-effector and the sensed forces at each time step t. A set of training vectors is obtained by recording the position and sensed forces at a specific sampling rate.
   a. For example, if one demonstration of the movement lasts 10 seconds, and the sampling rate is set to 50 Hz, then this demonstration is composed of 500 training vectors.
   b. If a demonstration phase is composed of 5 different demonstrations, then the final training data set is composed of 2500 training vectors, under the assumption that each demonstration lasts 10 seconds (with a fixed sampling rate of 50 Hz). Note that the demonstration duration does not affect the training process.
2. Given a set of training vectors, the dynamic features of this training dataset are computed using Eq. (6) below.
3. Given the set of dynamic features $\zeta_{1:t} = \{\zeta_1, \zeta_2, \ldots, \zeta_t\}$, an HSMM can be trained using a modified version of the Expectation-Maximization algorithm, as for example detailed in S. Yu "Hidden semi-Markov models," Artificial Intelligence, vol. 174 vo. 2, pp. 215-243, 2010. To implement this training method, it is necessary to define the number of states K for the HSMM. This can be set defined by the user or automatically set using Dirichlet processes.
   a. The first step to train an HSMM is to initialize the set of parameters. To do so, k-means can be used to give a first estimation of the HSMM Gaussian distributions, while the transition probability matrix can be initialized to random values.
   b. An iterative procedure is carried out to re-estimate the set of HSMM parameters, where the forward and backward variables are computed first, and then used to calculate intermediate variables (e.g., according to Eq. (4-9) in the paper of S. Yu referenced above). These intermediate variables are later used to re-estimate the set of HSMM parameters.
   c. At each training iteration, the likelihood of the training dataset is computed and checked to determine if it converges to a fixed point. If so, the iterative procedure is stopped.

The output of the training process is the set of HSMM parameters $$\Theta = \{\{a_{ij}\}_{j=1}^K, \mu_i^D, \sigma_i^D, \pi_i, \mu_i, \Theta_i\}_{i=1}^K.$$

Once trained, the HSMM can be used to derive a nominal task plan in the form of a desired sequence of states $s_{1:T} = \{s_1, s_2, \ldots, s_T\}$ for a given time horizon of length T and a set of discrete states $s_t \in \{1, \ldots, K\}$. To do so, the definition of the forward variable in HSMM may be exploited to compute the probability to be in state i at time step t and observe the partial observation $\zeta_{1:t} = \{\zeta_1, \zeta_2, \ldots, \zeta_t\}$, namely $\alpha_{t,i} \triangleq P(s_t = i, \zeta_{1:t})$, which is recursively computed with $$\alpha_{t,i} = \sum_{d=1}^{d^{max}} \sum_{j=1}^{K} \alpha_{t-d,j} \alpha_{j,i} \mathcal{N}_{d,i}^D \prod_{s=t-d+1}^{t} \mathcal{N}_{s,i}, \qquad (1)$$

$$h_{t,i} = \frac{\alpha_{t,i}}{\sum_{k=1}^{K} \alpha_{t,k}},$$

where $$\mathcal{N}_{d,i}^D = N(\log(d) | \mu_i^D, \sigma_i^D)$$

$$\mathcal{N}_{s,i} = N(\zeta_s | \mu_i, \Sigma_i). \qquad (2)$$

For $t < d^{max}$, the initialization is given by $$\alpha_{1,i} = \pi_i \mathcal{N}_{1,i}^D \mathcal{N}_{1,i}$$

$$\alpha_{2,i} = \pi_i \mathcal{N}_{2,i}^D \prod_{s=1}^{2} \mathcal{N}_{s,i} + \sum_{j=1}^{K} \alpha_{1,i} \alpha_{j,i} \mathcal{N}_{1,i}^D \mathcal{N}_{2,i},$$

$$\alpha_{3,i} = \pi_i \mathcal{N}_{3,i}^D \prod_{s=1}^{3} \mathcal{N}_{s,i} + \sum_{d=1}^{2} \sum_{j=1}^{K} \alpha_{3-d,j} \alpha_{j,i} \mathcal{N}_{d,i}^D \prod_{s=4-d}^{3} \mathcal{N}_{s,i},$$

etc., which corresponds to the update rule $$\alpha_{t,i} = \pi_i \mathcal{N}_{t,i}^D \prod_{s=1}^{t} \mathcal{N}_{s,i} + \sum_{d=1}^{t-1} \sum_{j=1}^{K} \alpha_{t-d,j} \alpha_{j,i} \mathcal{N}_{d,i}^D \prod_{s=t-d+1}^{t} \mathcal{N}_{s,i}. \qquad (3)$$

A HSMM can be seen as a model representing a high-level abstraction of the task, which encapsulates the observed sensorimotor and temporal patterns through the set observation, duration and transition probabilities. According to various embodiments, the controller 106 uses this statistical model to retrieve a smooth reference trajectory distribution to drive the robot motion and localize the force-guided adaptation of the statistical model.

In order to retrieve the reference trajectory distribution from the HSMM, according to various embodiments, an approach is used that exploits both static and dynamic features of the observed data, encapsulated in the observation and duration probability distributions.

In robotics, this provides a simple approach to synthesize smooth trajectories, which is achieved by coordinating the distributions of both static and dynamic features in the considered time series. According to various embodiments, this approach is used for retrieving a smooth reference trajectory distribution that will drive the robot motion according to the nominal task plan encoded by the HSMM.

Formally, let the state of the robot be defined as $\xi \in \mathbb{R}^D$, which can represent the robot end-effector pose, its joint configuration, or be composed of additional sensory information such as sensed Cartesian forces or joint torques.

For sake of simplicity, the retrieval of a reference distribution of trajectories of the robot end-effector position is presented for $x \in \mathbb{R}^D$ with D=3. However, the approach can be straightforwardly applied to alternative robot state representations.

For encoding robot movements, Cartesian velocities $\dot{x}$ and accelerations $\ddot{x}$ can be used as dynamic features of the robot motion. By considering an Euler approximation, they are computed as $$\dot{x}_t = \frac{x_{t+1} - x_t}{\Delta t}, \ddot{x}_t = \frac{\dot{x}_{t+1} - \dot{x}_t}{\Delta t} = \frac{x_{t+2} - 2x_{t+1} + x_t}{\Delta t^2}. \quad (4)$$

By using (4), the observation vector $\zeta_t$ can be used to represent the concatenated position, velocity and acceleration vectors at time step t, as follows $$\zeta_t = \begin{bmatrix} x_t \\ \dot{x}_t \\ \ddot{x}_t \end{bmatrix} = \begin{bmatrix} I & 0 & 0 \\ -\frac{1}{\Delta t}I & \frac{1}{\Delta t}I & 0 \\ \frac{1}{\Delta t^2}I & -\frac{2}{\Delta t^2}I & \frac{1}{\Delta t^2}I \end{bmatrix} \begin{bmatrix} x_t \\ x_{t+1} \\ x_{t+2} \end{bmatrix} \quad (5)$$

where $I \in \mathbb{R}^D$ is the identity matrix and $\Delta t$ the sampling time. It should be noted that the number of derivatives is set up to acceleration, but the results can be generalized to a higher or lower number of derivatives. Then, variables $\zeta$ and x are defined as large vectors by concatenating $\zeta_t$ and $x_t$ for all time steps, namely $$\zeta = [\zeta_1^T \zeta_2^T \ldots \zeta_T^T]^T \text{ and}$$

$$x = [x_1^T x_2^T \ldots x_T^T]^T.$$

Similarly to the matrix operator (5) defined for a single time step, a large sparse matrix $\Phi$ can be defined so that $\zeta = \Phi x$, namely $$\begin{bmatrix} \vdots \\ \zeta \\ \vdots \end{bmatrix} \begin{bmatrix} x_t \\ \dot{x}_t \\ \ddot{x}_t \\ x_{t+1} \\ \dot{x}_{t+1} \\ \ddot{x}_{t+1} \\ \vdots \end{bmatrix} = \begin{bmatrix} \ddots & \vdots & \vdots & \vdots & \cdots \\ \cdots & I & 0 & 0 & \cdots \\ \cdots & -\frac{1}{\Delta t}I & \frac{1}{\Delta t}I & 0 & \cdots \\ \cdots & \frac{1}{\Delta t^2}I & -\frac{2}{\Delta t^2}I & \frac{1}{\Delta t^2}I & \cdots \\ \cdots & I & 0 & 0 & \cdots \\ \cdots & -\frac{1}{\Delta t}I & \frac{1}{\Delta t}I & 0 & \cdots \\ \cdots & \frac{1}{\Delta t^2}I & -\frac{2}{\Delta t^2}I & \frac{1}{\Delta t^2}I & \cdots \\ \cdots & \vdots & \vdots & \vdots & \ddots \end{bmatrix} \begin{bmatrix} \vdots \\ x_t \\ x_{t+1} \\ x_{t+2} \\ x_{t+3} \\ \vdots \end{bmatrix} \quad (6)$$

The state sequence $s_{1:T}$ representing the nominal task plan can be exploited here to retrieve a reference trajectory distribution used to drive the robot end-effector movements.

To do so, the likelihood of a movement $\zeta$ for a given sequence s is defined as $$\mathcal{P}(\zeta \mid s) = \prod_{t=1}^{T} \mathcal{N}(\zeta_t \mid \mu_{s_t}, \Sigma_{s_t}) \quad (7)$$

where $\mu_{s_t}$ and $\Sigma_{s_t}$ are the mean and covariance matrix of state $s_t$ at time step t. This product can be rewritten as $$\mathcal{P}(\zeta \mid s) = \mathcal{N}(\zeta_t \mid \mu_s, \Sigma_s) \quad (8)$$

with $$\mu_s = \begin{bmatrix} \mu_{s_1} \\ \mu_{s_2} \\ \vdots \\ \mu_{s_T} \end{bmatrix}$$

and $$\Sigma_s = \begin{bmatrix} \Sigma_{s_1} & 0 & \cdots & 0 \\ 0 & \Sigma_{s_2} & \cdots & 0 \\ \vdots & \vdots & \ddots & \vdots \\ 0 & 0 & \cdots & \Sigma_{s_T} \end{bmatrix}$$

By using the relation $\zeta = \Phi x$, the controller 106 determines a trajectory x maximizing the logarithm of (8), namely $$\hat{x} = \underset{x}{\operatorname{argmax}} \ \log \mathcal{P}(\Phi x \mid s) \quad (9)$$

The part of log $P(\Phi x|s)$ dependent on x takes the quadratic error form $$c(x) = (\mu_s - \Phi x)^T \Sigma_s^{-1} (\mu_s - \Phi x).$$

A solution can be found by differentiating $c(x)$ and equating to 0, providing the trajectory (in vector form)

$$\hat{x} = (\Phi^T \Sigma_s^{-1} \Phi)^{-1} \Phi^T \Sigma_s^{-1} \mu_s, \quad (10)$$

with the covariance error of the weighted least-squares estimate given by $$\hat{\Sigma}^x = \sigma (\Phi^T \Sigma_s^{-1} \Phi)^{-1} \quad (11)$$

where $\sigma$ is a scale factor. Both (10) and (11) describe a reference trajectory distribution $$\mathcal{N}(\hat{x}, \hat{\Sigma}^x)$$

which represents the nominal task plan the robot device arrangement 100 learned from demonstrations. It should be noted that the aforementioned equations can be computed efficiently with Cholesky and/or QR decompositions by exploiting the positive definite symmetric band structure of the matrices.

According to various embodiments of the present invention, haptic cues by a user are exploited to indicate desired adaptations to the learned nominal plan. Therefore, according to an embodiment, the robot state is defined as $\xi = [x^T f^T]^T$, where $f \in \mathbb{R}^D$ represents the sensed Cartesian forces at the robot end-effector 104, leading to $\xi \in \mathbb{R}^{2D}$ and $I \in \mathbb{R}^{2D}$. As a consequence, on the basis of (9), the trajectory retrieval for this augmented state is formulated as $$\hat{\xi} = \underset{\xi}{\mathrm{argmax}} \ \log \mathcal{P}((\Phi\xi \mid s) \qquad (12)$$

whose solution has the same form as (10) and (11). This augmented state ξ allows not only to retrieve a desired end-effector trajectory distribution $$\mathcal{N}(\hat{x}, \hat{\Sigma}^x)$$

but also a reference force distribution $$\mathcal{N}(\hat{f}, \hat{\Sigma}^f).$$

The latter can be employed to set a reference force profile to track during the execution of the task as well as to identify external forces indicating a task adaptation phase. According to various embodiments, the controller 106 uses the reference force distribution $$\mathcal{N}(\hat{f}, \hat{\Sigma}^f).$$

to detect adaptation phases from physical interactions.

Once a nominal plan has been learned according to the above, the robot device arrangement 100 is ready to carry out the task. However, during reproduction, new task requirements may arise (e.g., alternative motion trajectories, new locations of objects of interest), thus requiring the robot to adapt its nominal plan to the new situation. A way to indicate desired task adaptations is haptic communication as illustrated in FIG. 2.

Figure 2A:
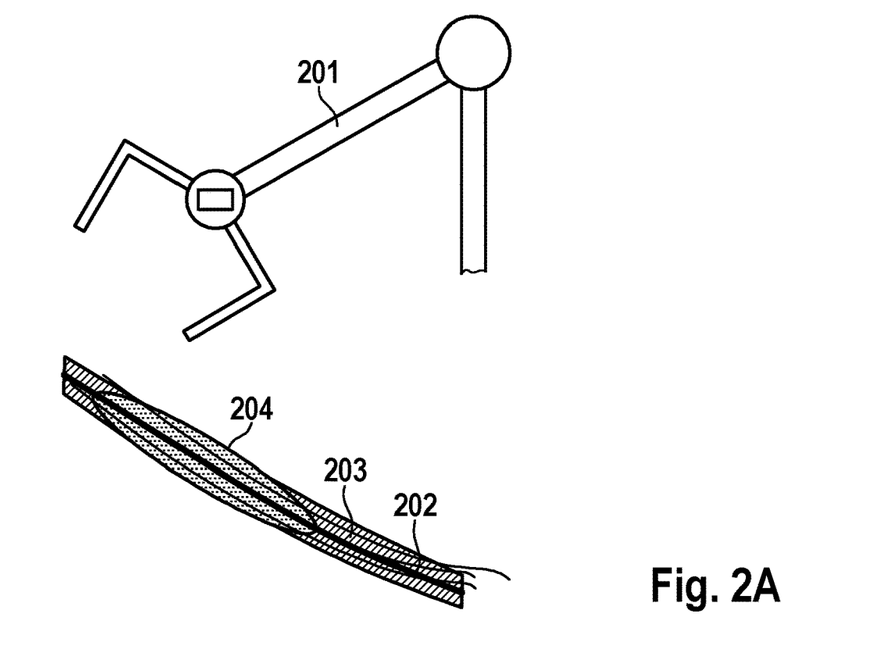
FIG. 2A and FIG. 2B show a robotic arm executing a nominal plan and in an interactive trajectory adaptation phase, respectively.

FIG. 2A shows a robotic arm 201 of a robot device, e.g., corresponding to the robot device 101, executing a nominal plan as previously learned from human demonstrations.

When no adaptation is needed, the robot 201 executes the task by following a reference trajectory distribution (solid line 202 depicting the mean and hatched area 203 representing the variance) extracted from the nominal task plan (represented by ellipse 204, which may correspond to a state of the HSMM).

Figure 2B:
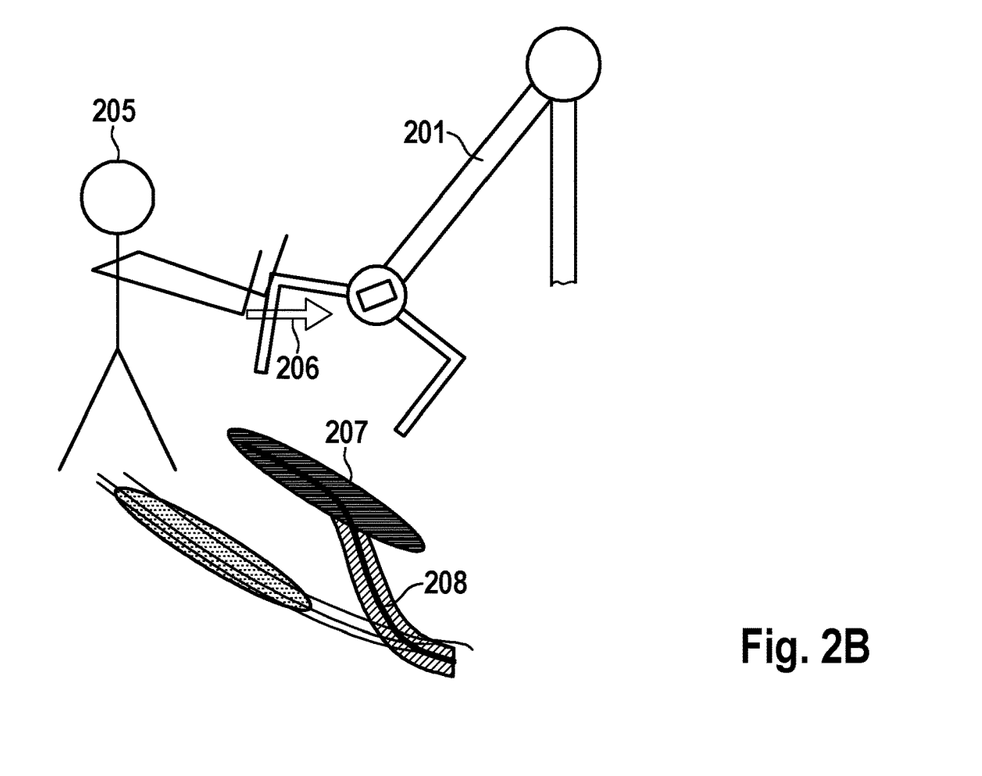

FIG. 2B shows the robotic arm 201 in an interactive trajectory adaptation phase.

A human operator 205 can introduce local trajectory adaptation by physically interacting with the robot, in this case a pushing force 206. The controller 106 adapts the nominal task plan to an adapted task plan 207 based on the force 206 so that disagreement forces (i.e., the difference between the expected force(s) and the experienced (measured) force(s) 206 is minimized) and changes the control of the robot to an adapted trajectory 208.

Thus, the human operator 205 may physically interact with the robot 201 in order to show the required adaptation through force-based cues. It should be noted that in the case where no physical interaction is possible, artificial guidance forces could be computed from a virtual environment where a human operator commands a virtual proxy to indicate necessary adaptations.

In the following, it is assumed that interaction forces convey information about a task adaptation required by a human 205. In other words, force-based cues provide information about an unobservable reward/objective function that the human 205 is trying to optimize through the trajectory adaptation. As crafting reward/objective functions is significantly cumbersome and data-efficient adaptation is imperative when a robot 201 interacts with a human 205, Bayesian optimization (BayesOpt) is used according to various embodiments to adapt the parameters of the nominal task plan. It should be noted that Bayesian optimization is only an example and other optimization approaches, e.g., a CMA-ES (Covariance Matrix Adaptation Evolution Strategy) may also be used.

In the following, a short introduction to BayesOpt is provided and later it is explained how the controller 106 may exploit this for the force-guided robot trajectory adaptation.

In general terms, the problem of finding a global maximizer (or minimizer) of an unknown objective function f $$\theta^* = \underset{\theta \in \chi}{\mathrm{argmax}} f(\theta) \qquad (13)$$

where $\chi \subseteq \mathbb{R}^{D_\chi}$ is some parameter space of interest, with $D_\chi$ being the dimensionality of the parameter space (i.e., the space of parameter values over which the optimization takes place). Furthermore, it is assumed that that the black-box function f has no simple closed form, but can be evaluated at any arbitrary query point θ in the parameter space. This evaluation produces noise-corrupted (stochastic) outputs y∈ $\mathbb{R}$ such that $\mathbb{E}[y|f(\theta)]=f(\theta)$. In other words, the function f can only be observed through unbiased noisy point-wise observations y. In this setting, a sequential search algorithm is considered which, at iteration n, selects a location $\theta_{n+1}$ at which to query f and observe $y_{n+1}$. After N queries, the algorithm makes a final recommendation $\theta_N$, which represents the algorithm's best estimate of the optimizer.

BayesOpt prescribes a prior belief over the possible objective functions and then sequentially refines this model as data are observed via Bayesian posterior updating. Equipped with this probabilistic model, BayesOpt can sequentially induce acquisition functions $\gamma_n: \chi \mapsto \mathbb{R}$ that leverage the uncertainty in the posterior to guide the exploration. Intuitively, the acquisition function evaluates the utility of candidate points for the next evaluation of f; therefore, $\theta_{n+1}$ is selected by maximizing n, where the index n indicates the implicit dependence on the currently available data.

A way to model the prior and posterior for f is by using a Gaussian Process $f(\theta) \sim GP(\mu(\theta), k(\theta_i, \theta_j))$
with mean function $\mu: \chi \mapsto \mathbb{R}$ and positive-definite kernel (or covariance function) $k: \chi \times \chi \mapsto \mathbb{R}$. Let $D_n = \{(\theta_i, y_i)\}_{i=1}^n$ denote the set of observations and $\tilde{\theta}$ represent an arbitrary test point. The random variable $f(\tilde{\theta})$ conditioned on observations $D_n$ is also normally distributed with the following posterior mean and variance functions:

$$\mu_n(\tilde{\theta}) = \mu(\tilde{\theta}) + k(\tilde{\theta})^T (K + \sigma^2 I)^{-1} (y - \mu(\theta)) \qquad (14)$$

$$\sigma_n^2(\tilde{\theta}) = k(\tilde{\theta}, \tilde{\theta}) - k(\tilde{\theta})^T (K + \sigma^2 I)^{-1} k(\tilde{\theta}) \qquad (15)$$

where $k(\tilde{\theta})$ is a vector of covariance terms between $\tilde{\theta}$ and $\theta_{1:n}$, and K is the covariance matrix for all the pairs $\theta_i$ and $\theta_j$. The posterior mean and variance evaluated at any point $\tilde{\theta}$ represent the model prediction and uncertainty, respectively, in the objective function at the point $\tilde{\theta}$. These posterior functions are exploited to select the next query point $\theta_{n+1}$ by means of an acquisition function.

An acquisition function performs a trade-off between exploitation (e.g., selecting the point with the highest posterior mean) and exploration (e.g., selecting the point with the highest posterior variance) using the information given by the posterior functions. Here, an improvement-based acquisition function is used, namely, expected improvement (EI), which is built on a function that incorporates the amount of improvement upon i, and can be analytically computed as follows $$\gamma_{EI}(\theta, \mathcal{D}_n) = (\mu_n(\theta) - \tau)\Phi\left(\frac{\mu_n(\theta) - \tau}{\sigma_n(\theta)}\right) + \sigma_n(\theta)\phi\left(\frac{\mu_n(\theta) - \tau}{\sigma_n(\theta)}\right), \quad (16)$$

where $\Phi$ is the normal cumulative distribution function, $\phi$ represents the corresponding probability density function, and $\tau$ is the threshold improvement. Intuitively, EI selects the next parameter point where the expected improvement over $\tau$ is maximal.

As mentioned previously, the human partner 205 can physically interact with the robot 201 to indicate, through force-based cues, a desired adaptation of the learned nominal plan. In order to let the robot negotiate its adaptation according to the human intention (which the robot device noisily observes, e.g., by means of a force sensor 113 at its end-effector 104), the controller 106 uses BayesOpt to carry out a local adaptation of the nominal model so that the difference between expected and measured force(s) (specifying the human-robot disagreement) is minimized. As the learning model as described above encapsulates both sensorimotor and duration patterns, spatiotemporal adaptations are possible.

Formally, sensorimotor patterns and duration information are locally encoded as Gaussian distributions $N(\mu_i, \Sigma_i)$ and $N(\mu_i^D, \sigma_i^D)$ as described above. These distributions directly influence the robot task execution through (1) and (9). In order to locally adapt the robot trajectory, the vector of local model parameters is defined as $$\theta_i = \begin{bmatrix} \mu_i^O \\ \mu_i^D \end{bmatrix} \quad (17)$$

where $\mu_i^O$ and $\mu_i^D$ represent the mean vector of motor commands and duration for state i, respectively (covariance parameters are omitted for simplicity). The controller 106 searches the vector of parameters $\theta_i$ using BayesOpt to find the optimization solution $\theta_i^*$ to minimize the human-robot disagreement when a desired adaptation is triggered by the user 205. It should be noted that when no desired force profile is required for the task, the disagreement forces directly correspond to the noisy readings $f^s$ of the force sensor 113 mounted at the robot end-effector 104 (e.g., at the robot wrist).

On the contrary, if a reference force distribution $$\mathcal{N}(\hat{f}, \hat{\Sigma}^f)$$

is given, the disagreement forces can be easily computed as the L-2 norm of the difference between the reference force $\hat{f}$ and the sensed force $f^s$. Therefore, in the present case, the set of observations used to compute the posterior mean and variance functions is $$\mathcal{D}_n = \{(\theta_{i,j}, \|\hat{f} - f^s\|_j)\}_{j=1}^n.$$

The fact that the learning model encodes the nominal plan using a set of states (represented by Gaussian distributions) allows to carry out a local search of the optimal parameters by identifying the state i in which the robot is when a desired adaptation is triggered. To do so, the definition of the forward variable (1) is used and the local adaptation parameters $\theta_i$ are chosen as those corresponding to the state $$i = \underset{j}{\mathrm{argmax}}\,\alpha_{t,j}. \quad (18)$$

This reduces the dimensionality of the parameter space in contrast to a high-dimensional vector $\theta$ composed of all the mean vectors of motor commands and durations of the learning model. Moreover, the domain (parameter space) $\chi$ can be automatically extracted from human demonstrations, where both $$\Sigma_i^O$$

and $\sigma_i^D$ specify local bounds in which BayesOpt searches for the optimization solution $\theta_{i,N}$. For example, lower and upper bounds for the sensorimotor component of $\theta_i$ may be defined as $(\mu_i^O - 2\sigma_i^O, \mu_i^O + 2\sigma_i^O)$ where $\sigma_i^O$ is the variance vector in $$\Sigma_i^O$$

The controller 106 may adapt the robot's trajectory online. When it detects human intervention (based on a measured force different from an expected force at force sensor 113), meaning that trajectory adaptation should take place, it updates the reference trajectory over the course of the task. To do so, every time the controller 106 finds a set of optimal parameters $\theta_{i,N}$ by means of the force-based local BayesOpt, the controller 106 generates a new reference distribution of trajectories by computing a new sequence of states $s_t:T_w$ Via (1) for a Time window of length $T_w$.

The controller 106 determines the sequence of states by the most likely state for each t according to Eq. (1) which specifies the probability to be in a certain state t and have a certain observation sequence until time t.

The controller 106 may use the state sequence to generate the new (i.e., adapted) trajectory distribution through (10) and (11). It should be noted that the specification of a time window assumes that the interactive trajectory adaptation occurs for relatively short time periods, meaning that the robot 201 is expected to resume the execution of the nominal plan once the human operator does not trigger any adaptation. Moreover, the time window favours the computational cost of the whole adaptation process.

Figure 3A:
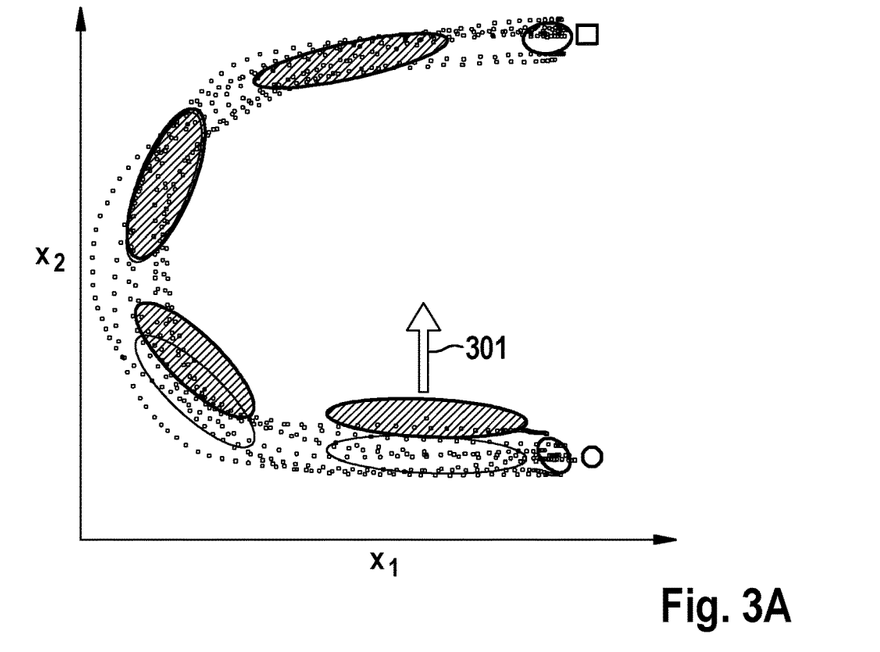
FIG. 3A and FIG. 3B illustrate nominal and adapted task plans and trajectories.
Figure 3B:
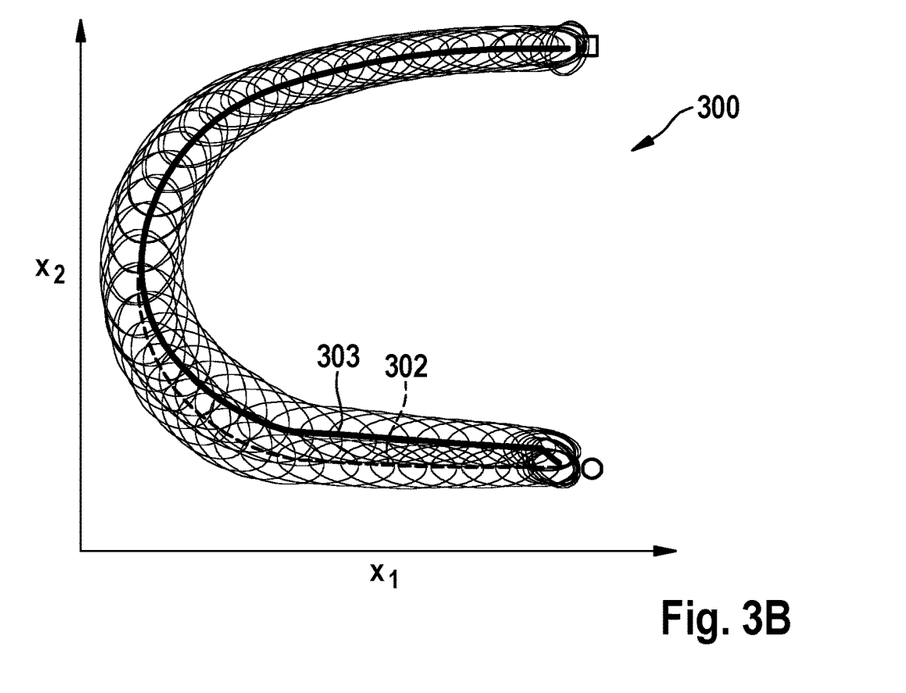

FIGS. 3A and 3B illustrate a trajectory adaptation.

In this example, the task is a pick-and-place task with a C-shaped trajectory. A pick-and-place task is a standard setup where a robotic arm is required to reach for an object, grasp it, and consequently move it to a target location into its workspace, where the object is released.

The example of FIGS. 3A and 3B is based on the collection of six synthetic demonstrations where both 2D Cartesian trajectories and sensed force profiles were generated while the robot followed the C-shaped trajectory. It should be noted that in this particular task the robot does not require to apply a specific force while moving the object, which means that the recorded sensed forces are zero-mean. In the present example, a six-state HSMM has been trained to learn the nominal plan of the task, which is mainly encapsulated by the set of normal distributions $\{N_{s,i}, N_i^D\}_{i=1}^K$ encoding local sensorimotor patterns and duration information.

During reproduction of the task, the robot end-effector movement is mainly driven by the reference trajectory distribution computed by (10) and (11). The detection of human intervention is carried out by monitoring the difference between the reference force distribution $$\mathcal{N}(\hat{f}_f, \hat{\Sigma}_t^f)$$

and the sensed forces f°.

A time window of five time steps was used to compute these disagreement forces. If human intervention is detected, a local adaptation process is triggered by running the forge-guided local search described above. This local search is implemented by determining new local parameters $\theta_{i,t+1}$ at each time step t according to the acquisition function (16). Once the set of local parameters $\theta_i^*$ resulting from optimization has been found, the reference trajectory distribution is recomputed using the updated observation and duration probabilities of state i with new means $\mu_i^{O*}$ and $\mu_i^{D*}$.

In FIG. 3A, demonstration data of 2D trajectories are displayed as points. The nominal task plan encoded by the HSMM is shown as white ellipses and the adapted model is shown as hatched ellipses. The applied force in this example is represented by the arrow 301. The ellipses represent the HSMM observation probability distributions $N_{s,i}$.

In FIG. 3B, the reference trajectory 302 and its distribution retrieved by using the HSMM properly encodes the sensorimotor patterns observed in the demonstrations. As a result of the local adaptation in response to the force 301, the adapted trajectory 303 matches the nominal plan when no external force is applied, and it deforms according to the local changes imposed by the force-guided BayesOpt. More specifically, the new means $\mu_i^{O*}$ and $\mu_i^{D*}$ computed by BayesOpt directly affect the adapted trajectory distribution computed via (10).

This local adaptation allows the user to introduce small changes in the trajectory without affecting relevant patterns of the task, such as the start and end of the reference distributions in FIG. 3 which are crucial for reaching and releasing the manipulated object.

Figure 4:
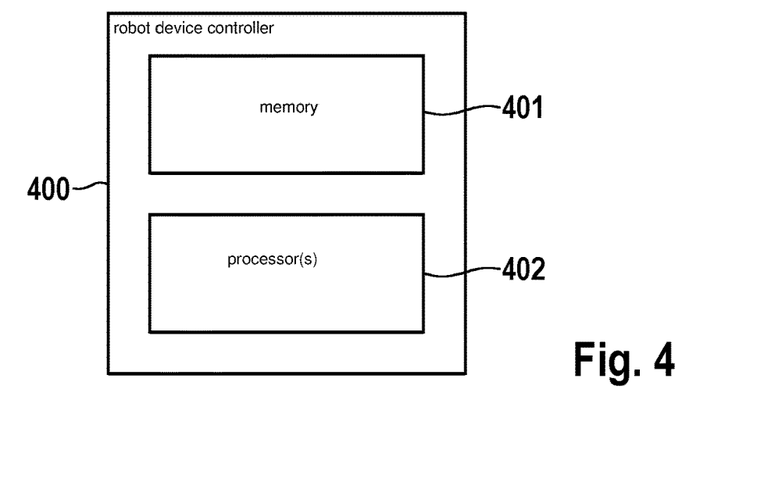
FIG. 4 shows a robot device controller according to an embodiment.

In summary, according to various embodiments, a robot device controller is provided as illustrated in FIG. 4.

FIG. 4 shows a robot device controller 400 according to an embodiment.

The robot device controller 400 includes a memory 401 configured to store a statistical model trained to implement a behaviour of the robot device.

Further, the robot device controller 400 includes one or more processors 402 configured to determine a nominal trajectory represented by the statistical model, determine an expected force experienced by the robot device when the robot device is controlled to move in accordance with the nominal trajectory, determine a measured force experienced by the robot device when the robot device is controlled to move in accordance with the nominal trajectory and adapt the statistical model based on a reduction of the difference between the measured force and the expected force.

According to various embodiments, in other words, information about the interaction forces at the level of a robot end-effector (or at one or more other positions of a robot device), are used as indication of desired local trajectory deformations by a user. Such sensory information is used to guide an adaptation process of the statistical model based on which the robot is controlled. The adaptation modifies the nominal model parameters so that the resulting trajectory distribution is locally adapted according to the sensed forces in an smooth way. It should be noted that a "force" may correspond to a force vector having components for different directions in space and also for different points of action on the robot device.

The approach of FIG. 4 can be seen to be based on the assumption that the force data produced by a human conveys information regarding the human intended adaptation. These data are used to compute disagreement forces that the robot sought to minimize by locally adapting its task model, previously learned from demonstrations.

Thus, the desired trajectory of a robot, e.g., a robot end-effector, may be shaped by physical interaction based on a difference between an expected and measured force and adaptation of a statistical model which serves as a basis for the robot control. A trajectory may be derived from the statistical model which has been trained, e.g., the robot device previously learned a nominal plan of the task at hand (represented as a reference trajectory distribution).

The trajectory may, by means of adaptation of the statistical model, be adapted online as a function of the interaction forces sensed, e.g., at the robot's end-effector. The interaction forces are assumed to indicate a desired (possibly) local deformation of the reference trajectory.

In one embodiment, Bayesian optimization is used to adapt the nominal task plan and as a consequence, the reference trajectory is adapted as the HSMM states have changed. The adapted trajectory is retrieved according to equations 10 and 11.

The one or more processors may determine the force experienced by the robot device from sensor signals, including for example any type of force or torque sensor, e.g., attached at the robot end-effector, or by using joint torque sensors of the robot.

The one or more processors are configured to compute a control signal for controlling a mechanical part of the robot device, e.g., a robot arm or in general a physical system (having a mechanical part whose movement is controlled), like a computer-controlled machine, a vehicle, a domestic appliance, a power tool, a manufacturing machine, a personal assistant or an access control system. Based on the approach of FIG. 4 a machine learning system may be trained and adapted and may be used for the above applications.

According to various embodiments, a controller (including one or more processors) of a robot device is configured to generate (or at least to store) a probabilistic learning model that encodes the sensorimotor patterns of a task of a robot (e.g., a hidden semi-Markov model HSMM), to retrieve a reference trajectory distribution and to drive the robot end-effector motion in accordance with the reference trajectory distribution, to monitor human intervention (through physical interaction force(s)) and to perform a force-guided optimization (e.g., local Bayesian optimization) to modify the model parameters according to the sensed interaction force(s).

The one or more processors may be configured to first control the robot device to move in accordance with the nominal trajectory and, after adaptation of the statistical model, in accordance with an adapted trajectory represented by the adapted statistical model. It should however be noted that this may happen online, i.e., the robot device may be partially controlled according to the nominal trajectory and then according to the adapted trajectory when an adaptation event has occurred.

The term "processor" can be understood as any type of entity that allows the processing of data or signals. For example, the data or signals may be treated according to at least one (i.e., one or more than one) specific function performed by the processor. A processor may include an analogue circuit, a digital circuit, a composite signal circuit, a logic circuit, a microprocessor, a central processing unit (CPU), a graphics processing unit (GPU), a digital signal processor (DSP), a programmable gate array (FPGA) integrated circuit or any combination thereof or be formed from it. Any other way of implementing the respective functions, which will be described in more detail below, may also be understood as processor or logic circuitry. It will be understood that one or more of the method steps described in detail herein may be executed (e.g., implemented) by a processor through one or more specific functions performed by the processor.

Figure 5:
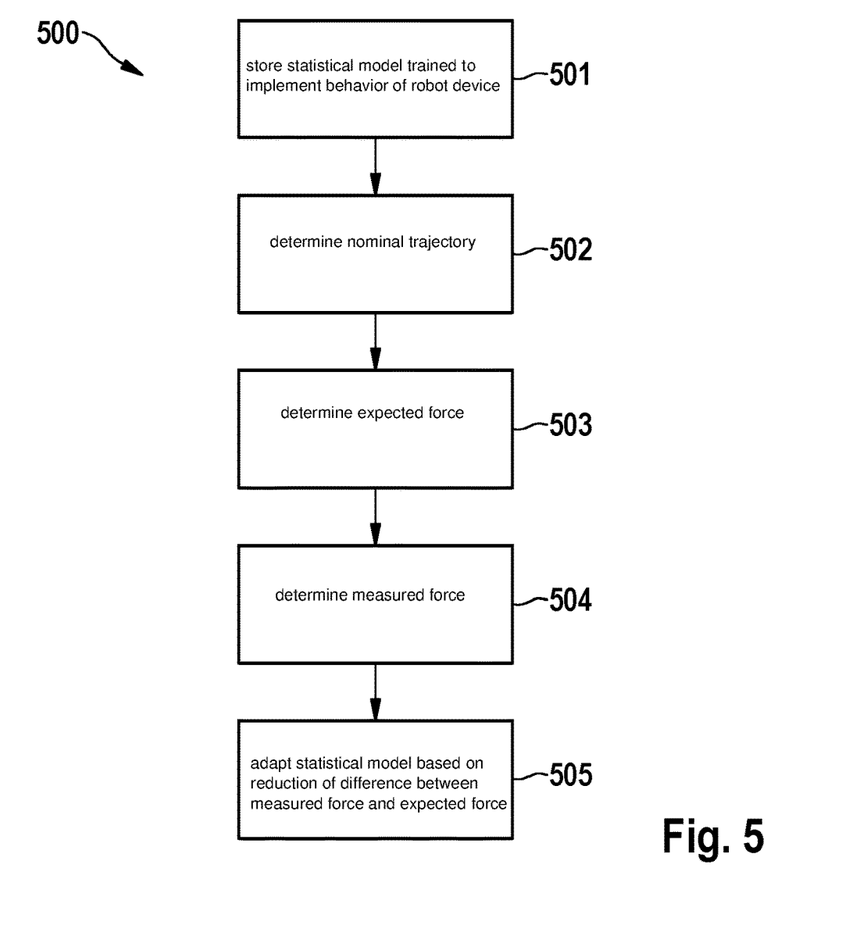
FIG. 5 shows a flow diagram illustrating a method for controlling a robot device according to an embodiment.

FIG. 5 shows a flow diagram 500 illustrating a method for controlling a robot device according to an embodiment.

In 501, a statistical model trained to implement a behaviour of a robot device is stored.

In 502, a nominal trajectory represented by the statistical model is determined.

In 503, an expected force experienced by the robot device when the robot device is controlled to move in accordance with the nominal trajectory is determined.

In 504 a measured force experienced by the robot device when the robot device is controlled to move in accordance with the nominal trajectory is determined and In 505 the statistical model is adapted based on a reduction of the difference between the measured force and the expected force.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of the specific embodiments discussed herein.

What is claimed is:

1. A robot device controller, comprising:
   a memory configured to store a statistical model trained to implement a behaviour of a robot device; and
   one or more processors configured to:
      determine a nominal trajectory represented by the statistical model;
      determine an expected force experienced by the robot device when the robot device is controlled to move in accordance with the nominal trajectory;
      determine a measured force experienced by the robot device when the robot device is controlled to move in accordance with the nominal trajectory; and
      adapt the statistical model based on a reduction of the difference between the measured force and the expected force.

2. The robot device controller according to claim 1, wherein the one or more processors are configured to adapt the statistical model by adapting one or more parameters of the statistical model including at least one parameter of one or more probability distributions.

3. The robot device controller according to claim 2, wherein the one or more processors are configured to adapt the one or more parameters based on an optimization.

4. The robot device controller according to claim 3, wherein the optimization is based on an objective function based on a difference between an actual force and an experienced force.

5. The robot device controller according to claim 3, wherein the optimization is based on a Bayesian optimization or a Covariance Matrix Adaptation Evolution Strategy.

6. The robot device controller as recited in claim 3, wherein the optimization is based on reducing a difference between the expected force and the measured force.

7. The robot device controller according to claim 1, wherein the one or more processors are configured to adapt the statistical model by adapting one or more parameters of the statistical model including at least one of a mean and a standard deviation of one or more Gaussian distributions.

8. The robot device controller according to claim 1, wherein the statistical model has a plurality of hidden states, each of the states being associated with an observation probability distribution.

9. The robot device controller according to claim 8, wherein the one or more processors are configured to detect a trajectory adaptation event based on a difference between the measured force and the expected force, to determine a state of the statistical model representing a part of the nominal trajectory in which the trajectory adaptation event has occurred and to perform an optimization over parameters of the observation probability distribution.

10. The robot device controller according to claim 9, wherein the one or more processors are configured to further perform the optimization over parameters of a duration probability distribution associated with the determined state.

11. The robot device controller according to claim 9, wherein the one or more processors are configured to omit from the optimization parameters of probability distributions associated with other states than the determined state.

12. The robot device controller according to claim 9, wherein the one or more processors are configured to limit the optimization to parameters of probability distributions associated with the determined state.

13. The robot device controller as recited in claim 9, wherein the optimization is based on reducing a difference between the expected force and the measured force.

14. The robot device controller according to claim 1, wherein the one or more processors are configured to train the statistical model based on one or more demonstrations of at least one trajectory.

15. The robot device controller according to claim 1, wherein the statistical model is a Gaussian mixture model, or a hidden Markov model, or a hidden semi-Markov model.

16. The robot device controller as recited in claim 1, wherein the statistical model is a Gaussian mixture model, or a hidden Markov model, or a hidden semi-Markov model, and wherein the nominal trajectory is a planned trajectory for the robot device.

17. The robot device controller as recited in claim 16, wherein the statistical model encodes the nominal trajectory using a set of states.

18. A robot device arrangement, comprising:
   a robot device; and
   a robot device controller including:
      a memory configured to store a statistical model trained to implement a behaviour of a robot device; and
      one or more processors configured to:
         determine a nominal trajectory represented by the statistical model;

determine an expected force experienced by the robot device when the robot device is controlled to move in accordance with the nominal trajectory;

determine a measured force experienced by the robot device when the robot device is controlled to move in accordance with the nominal trajectory; and adapt the statistical model based on a reduction of the difference between the measured force and the expected force.

19. The robot device arrangement as recited in claim 18, wherein the statistical model is a Gaussian mixture model, or a hidden Markov model, or a hidden semi-Markov model, and wherein the nominal trajectory is a planned trajectory for the robot device.

20. The robot device arrangement as recited in claim 19, wherein the statistical model encodes the nominal trajectory using a set of states.

21. A method for controlling a robot device, comprising the following steps:

storing a statistical model trained to implement a behaviour of a robot device;

determining a nominal trajectory represented by the statistical model;

determining an expected force experienced by the robot device when the robot device is controlled to move in accordance with the nominal trajectory;

determining a measured force experienced by the robot device when the robot device is controlled to move in accordance with the nominal trajectory; and adapting the statistical model based on a reduction of the difference between the measured force and the expected force.

22. The method as recited in claim 21, wherein the statistical model is a Gaussian mixture model, or a hidden Markov model, or a hidden semi-Markov model, and wherein the nominal trajectory is a planned trajectory for the robot device.

23. The method as recited in claim 22, wherein the statistical model encodes the nominal trajectory using a set of states.

\* \* \* \* \*